(12) United States Patent
Kitamorn et al.

(10) Patent No.: US 12,229,122 B2
(45) Date of Patent: Feb. 18, 2025

(54) INTEGRATED OPERATING SYSTEM SEARCH USING SCOPE OPTIONS

(71) Applicant: MICROSOFT TECHNOLOGY LICENSING, LLC, Redmond, WA (US)

(72) Inventors: Sage Kitamorn, Seattle, WA (US); Sushuma Gouravaram, Redmond, WA (US); David Phillips, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/699,565

(22) Filed: Mar. 21, 2022

(65) Prior Publication Data

US 2022/0207031 A1 Jun. 30, 2022

Related U.S. Application Data

(63) Continuation of application No. 16/601,187, filed on Oct. 14, 2019, now Pat. No. 11,281,663, which is a continuation of application No. 15/141,529, filed on Apr. 28, 2016, now Pat. No. 10,445,315.

(51) Int. Cl.
| | |
|---|---|
| *G06F 7/00* | (2006.01) |
| *G06F 3/0482* | (2013.01) |
| *G06F 16/242* | (2019.01) |
| *G06F 16/248* | (2019.01) |
| *G06F 16/9535* | (2019.01) |

(52) U.S. Cl.
CPC ........ *G06F 16/2428* (2019.01); *G06F 3/0482* (2013.01); *G06F 16/248* (2019.01); *G06F 16/9535* (2019.01)

(58) Field of Classification Search
CPC ............. G06F 16/2428; G06F 16/9535; G06F 16/248; G06F 3/0482
USPC ................................................. 707/600–899
See application file for complete search history.

(56) References Cited

U.S. PATENT DOCUMENTS

| | | | |
|---|---|---|---|
| 7,590,699 B2 * | 9/2009 | Natarajan | G06F 16/951 709/206 |
| 2007/0073713 A1 * | 3/2007 | Thomas | G06F 16/34 707/E17.093 |

* cited by examiner

*Primary Examiner* — Isaac M Woo
(74) *Attorney, Agent, or Firm* — Shook, Hardy & Bacon L.L.P.

(57) ABSTRACT

Methods and systems are provided for narrowing a scope of a search on a computing device to provide relevant search results to the user. Prior to receiving a search query from the user in a search box of a desktop taskbar, scope options are communicated for presentation from which the user can select. These scope options enable the user to select from web-based searches and local searches. A selection is received form the user of one of the scope options. Suggested search results are generated based on this scope option selection. At least one suggested search results is communicated for presentation on a display of the computing device.

11 Claims, 12 Drawing Sheets

INTEGRATED OPERATING SYSTEM SEARCH USING SCOPE OPTIONS

CROSS-REFERENCE INFORMATION

This application is a Continuation of Application of U.S. application Ser. No. 16/601,187 entitled "Integrated Operating System Search Using Scope Options," and filed Oct. 14, 2019, which is a continuation application of U.S. application Ser. No. 15/141,529, entitled "Integrated Operating System Search Using Scope Options," and filed Apr. 28, 2016. The aforementioned applications are incorporated by reference herein.

BACKGROUND

Search systems provided on a user's computing device, such as on a desktop screen, have traditionally been difficult for the user to navigate. Even more, some of these systems are limited to searching local documents only. When using a traditional-type search box on a user's desktop, the user may not find success the first few times of use, and thus will give up and not think about using it the next time that user desires to perform a search. Because of the wide range of domains available for a user to search, search results using these types of systems can be irrelevant to the user's intent, which may cause the user to abandon this search function.

Search functions exist on the Internet, such as search engines that search for web documents and websites based on a search query. Further, some e-mail systems have a search function to search for e-mails in that system based on a keyword query. However, each of these search systems is separate and is capable of searching only one domain (e.g., web, e-mails), and requires the user to perform multiple searches in each system.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein are directed to narrowing or filtering search results by way of selectable scope options available to the user. For instance, scope options could include "files," "apps," "photos," "videos," "music," "settings," "web," etc. While some of these scope options include items in the same domain, some are in different domains. For instance, searching for documents on the web searches a different domain than searching for documents on the user's computer. There is enormous benefit in having a single search box that can be used by a user to search different domains, such as both documents on the web and those on the computer (e.g., saved locally) either in separate searches or simultaneously. However, to assist the user in obtaining search results that are valuable and satisfy the user's try intent, scope options are provided. Scope options could be selected by the user before the user has even entered any characters into the search box. For instance, generic search results may be provided to the user when the user interacts with the search box, but before the user enters a search query or selects a scope option. When the user selects a scope option, these generic search results, which could be results pertaining to the user's recent activity, popular searches, etc., are filtered to satisfy the particular scope options elected. Therefore, even though the user has not yet even entered a search query (e.g., zero input), the returned search results are tailored to the user's intent.

BRIEF DESCRIPTION OF THE DRAWINGS

Aspects of the technology described in the present application are described in detail below with reference to the attached drawing figures, wherein.

DETAILED DESCRIPTION

Figure 1:
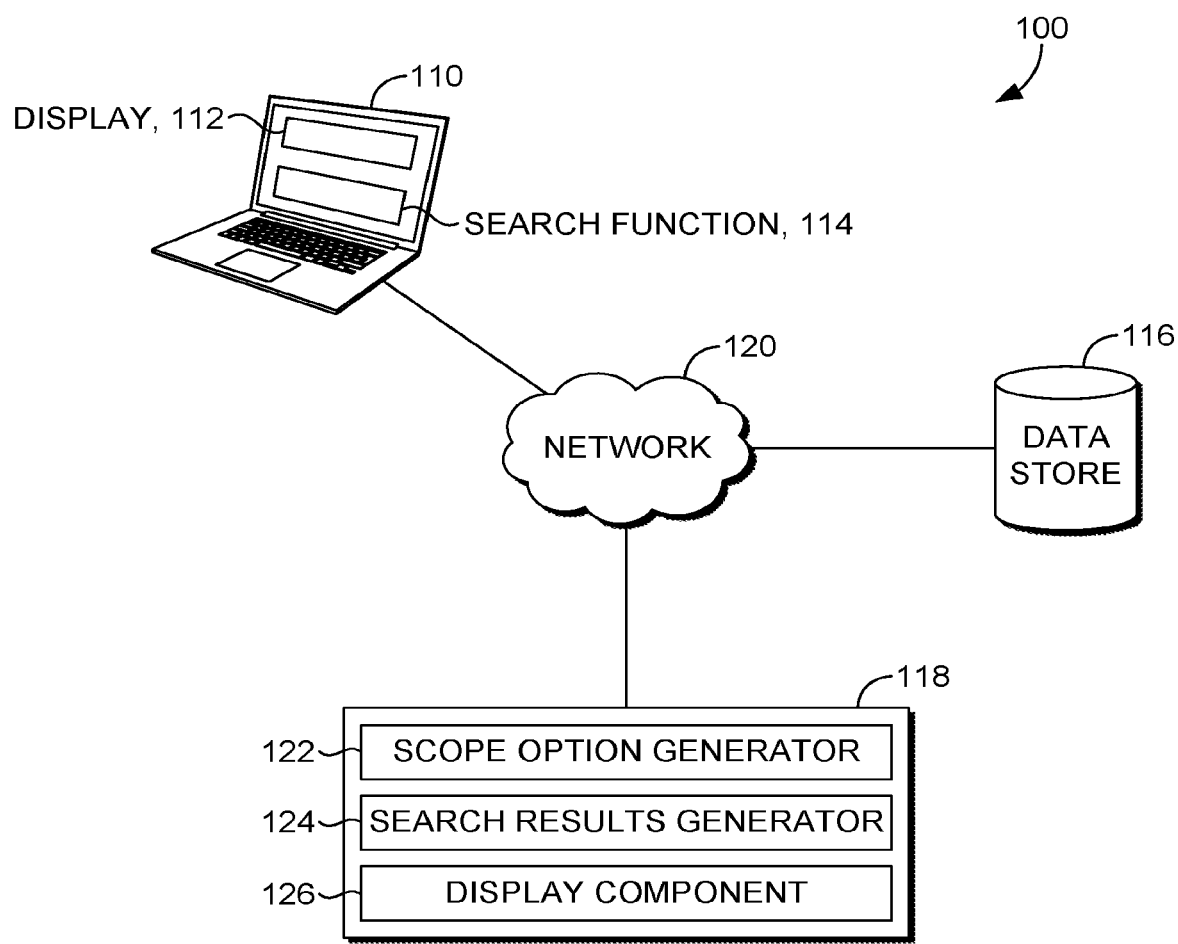
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Typically in systems that allow for a user to perform a search from a desktop taskbar, users may not discover the full capabilities of the search box. Users who do not find some success tend to discover and use only one of the many functions of the search box. Additionally, the overall success of the user's search sessions may be sub-optimal due to the imperfect ability of the system to decipher the user's intent given imprecise search queries across a wide range of possible domains. The user may then abandon the search function after very few attempts if it does not prove its utility within these first few search sessions.

In an effort to provide technical solutions to the traditional systems of searching either on the web or on a desktop, embodiments described herein enable a user to refine search results by presenting selectable scope options in the zero input box, such as above, below, or to one side of the search results. Using the scope options, the user may be able to search web (e.g., an Internet search) or local documents (e.g., searching the user's hard drive for applications, files, images, settings). For instance, a user may be using his/her computing device with the intent of searching one of multiple types of searches, such as, for example, to find a document, open an application, adjust an operating system setting, search the web, or the like. The user may select or otherwise interact (e.g., mouse click, touch input, stylus input, keyboard shortcut) with the search box, such as the search box integrated with the operating system of the computing device. This indicates to the system that the user wishes to use the search function. Prior to the user entering any search query into the search box, the user may be presented with a zero input box, which may include a sequence of scope options, such as iconographic buttons (e.g., buttons with text labels). While traditional systems may not even present a zero input box, such as one with generic suggested search results, and may wait for the user to enter a search query, aspects described herein have the advantage of providing the user with some suggested results before the user has even entered a query, which could greatly reduce the time of the search session.

An additional benefit for the user of this system is related to ergonomics. If the user's default hand position while using their computer is to have one hand on the mouse, the zero input scoping system as described herein may allow the user to find desired result(s) without moving his/her hand from the mouse to the keyboard. For example, the pattern would be click-click-click instead of click-click-<move hand>-type-type-<move hand>-click.

Some examples of scope options include "apps," "documents," "settings," "web," etc. The presence of these options, which may include an icon with an image, text label, or both, enables the user to understand the array of capabilities of the search system, regardless of whether or not the user selects any of the scope options. For instance, the user may have, on his/her own, discovered that the search box is great for opening applications and continue to use it for that purpose, but could remain unaware that this search box is also capable of searching the web. The presence of the scope options provides an unobtrusive opportunity or user education each time the scope options are presented. FIGS. 2-9 illustrate exemplary screenshots of integrated desktop taskbar search boxes, zero input boxes, and scope options. It should be noted that the size, number, order, labels, specific iconography, etc., are modifiable. Further, the specific set of scope options provided to a user could be static (unchanging) or could be dynamic based on signals such as the user's past use, location, installed software, system capabilities, or user preferences. If the user does select one of the scope options, this input is interpreted as a "scope restriction" by the search system. In the subsequent screen, the user is shown suggested results of the scoped search, even before the user has entered a single character into the search box, as the user has restricted the search by way of the selected scope option. The user could select a particular suggested result, if it is displayed, or could decide to start entering characters into the search box to further refine their search.

As such, aspects of the technology described herein facilitate narrowing a user's search by providing selectable scope options that tailor which documents are provided in a set of search results. For example, instead of requiring a user to open a browser window, navigate to a search engine, and submit a search query to retrieve web search results, embodiments provided herein allow a user to use the search box provided on the desktop, such as, for example, on the desktop taskbar, to search both for documents on the web and locally-stored documents. The user is able to select a scope option based on the user's current search intent.

Figure 3:
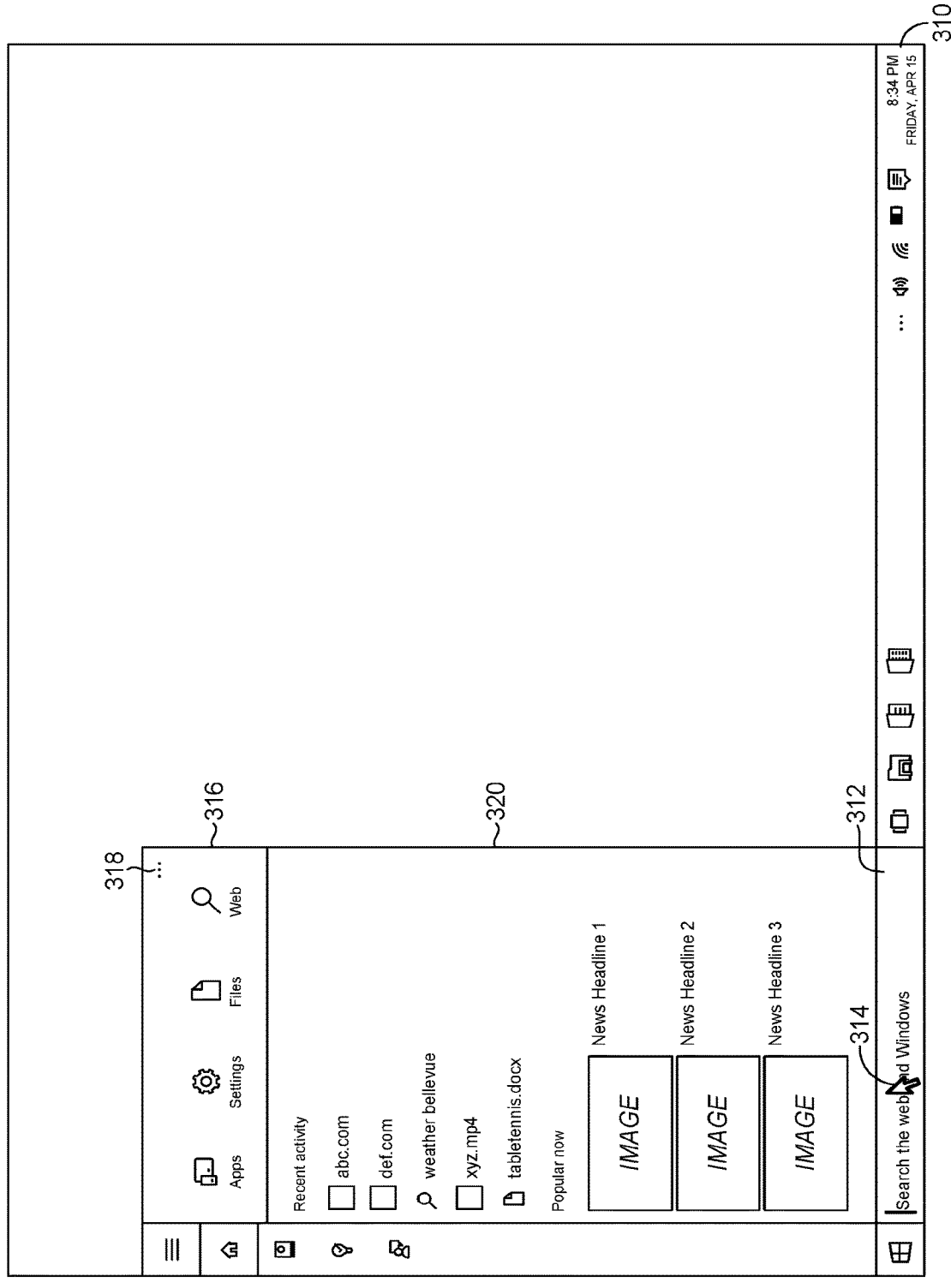
FIG. 3 is a screenshot of an exemplary desktop having a zero input box and search options, in accordance with aspects herein.

In embodiments, the scope options may be presented on the user's desktop or some other user interface on the display 112 even before any search query has been entered in the search box in the desktop toolbox. For example, the user may interact with the search box by hovering over it or selecting some portion of it, which, in one embodiment, causes a zero input box to be displayed. This screen may not take up the entire display, but in some embodiments, may take up just a portion of the display. FIG. 3, among others, illustrates a zero input box. The zero input box may initially include a plurality of scope options and suggested search results, such as popular searches, recent documents, etc. These types of results may be displayed until, for example, the user selects a scope option, enters a search query, or both. Once the user selects a scope options, the search results may be tailored to fit the particular type of results indicated by the selected scope option. For example, if the "applications" scope option is selected, the current search results may be removed and replaced with only search results that are or that represent applications. As another example, if the "web" scope option is selected, only search results that are on the web are presented. Subsequent to a first scope option being selected, a second scope option may be selected. In one embodiment, the selection of a second scope option may even further narrow the search results such that both the first and second scope options are applied, but in another embodiment, the first scope option is replaced with the second scope option such that the search results are tailored only to the second scope option.

In embodiments, the system may not be able to provide any suggested search results as a result of a user selecting a scope option. In this case, the user may be prompted to enter at least a portion of a search query into the search box. The suggested search results based on that at least a portion of the search query would then be refined or filtered based on the previously selected scope option. Even though no search results were provided to the user based solely on the selected scope option, the user's intent is still captured by providing refined search results based on the user's entered, at least partial query.

According to a first aspect herein, a method is provided for enabling a user to narrow a scope of a search on a computing device to provide relevant search results to the user. The method includes, prior to receiving a search query from the user in a search box of a desktop taskbar, communicating for presentation a plurality of scope options from which the user can select, wherein the plurality of scope options enable the user to select from web-based searches and local searches. Further, the method includes receiving a selection from the user of one of the plurality of scope options and based on the received selection of the one of the plurality of scope options, generating at least one suggested search result to present to the user. The method additionally includes communicating for presentation the at least one suggested search result on a display of the computing device.

According to a second aspect herein, a computing device is provided. The computing device includes at least one processor and a computer storage memory having computer-executable instructions stored thereon which, when executed by the at least one processor, configure the computing device to perform method steps. The method includes, prior to receiving a search query from the user in a search box of a desktop taskbar, communicating for presentation a plurality of scope options from which the user can select, wherein the plurality of scope options enable the user to select from web-based searches and local searches, and receiving a selection from the user of one of the plurality of scope options. Further, the method includes, based on the received selection of the one of the plurality of scope options, generating at least one suggested search result to present to the user, and communicating for presentation the at least one suggested search result on a display of the computing device.

According to a third aspect herein, one or more computer storage hardware devices having computer-executable instructions embodied thereon are provided that, when executed, enable a user to narrow a scope of a search on a computing device to provide relevant search results to the user. The method includes providing a search box on a desktop taskbar, where the search box enables the user to search both on the web and locally, and receiving an indication that the user is interacting with the search box. Further, the method includes, in response to the indication and prior to receiving a search query from the user in the search box of the desktop taskbar, communicating for presentation a plurality of scope options that allow the user to select from web-based searches or local searches. Additionally, the method includes receiving a selection from the user of one of the plurality of scope options, generating one or more suggested search results based on the received selection of the one of the plurality of scope options, and communicating for presentation the one or more suggested search results that are based on the received selection of the one of the plurality of scope options.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a user computing device 110, a data store 116, and a scope option component 118. It should be understood that environment 100 shown in FIG. 1 is an example of one suitable operating environment. Each of the components shown in FIG. 1 may be implemented via any type of computing device, such as computing device 1200 described in connection to FIG. 12, for example. These components may communicate with each other via network 120, which may include, without limitation, one or more local area networks (LANs) and/or wide area networks (WANs). In exemplary implementations, network 120 comprises the Internet and/or a cellular network, amongst any of a variety of possible public and/or private networks.

User computing device 110 may be a device on the client-side of operating environment 100, while the other components illustrated in FIG. 1, may be on the server side of operating environment 100.

User computing device 110 may comprise any type of computing device capable of use by a user. For example, in one aspect, user computing device 110 may be the type of computing device 1200 described in relation to FIG. 12 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

User computing device 110 comprises a display 112 and a search function 114. For instance, the display 112 may display a search box, a zero input box, scope options, etc. The search function 114 enables a user to search for documents, files, folders, applications, settings, etc., both on the web and locally. For example, instead of a user being required to open a browser to search for a document or other type of file on the web, the user can simply utilize a single search box on the user's desktop to search for any types of documents or other files. As such, the search function 114 allows for a single search box to be displayed on the display 112 so that the user can search all types of documents across multiple domains in a single search, including those on the web and those stored locally on the user computing device 110. The user may have the capability to search, for instance, documents on the computer, documents stored in the user's cloud storage, web documents, web sites, system setting, etc.

The scope option component 118 includes a scope option generator 122, a search results generator 124, and a display component 126. While in FIG. 1, the scope option component 118 is illustrated as being accessed by way of a network, in one instance, the steps performed by the scope option component 118 are performed locally, such as by the user device 110. As such, in these instances, the Internet or other network may not be utilized to provide scope options, generate search results, and display the results to the user. In other words, even when the user device 110 is offline, the user may be able to utilize the functionality of the scope options when performing a search. The user device 110 may even be able to cache, in its own data store, a default set of scope options that can be provided to the user when the user interacts with the search box.

Generally, the scope option component 118 is responsible for generating and presenting the user, on the display 112, with a plurality of scope options that can be used by the user to narrow the search scope even before any search query has been inputted into the search box (zero input). The zero input box, illustrated initially in FIG. 3, is an area of a desktop the appears when the user first interacts with the search box, even if the user has not yet entered anything into the search box. Once the search has been narrowed by way of scope options, search results may be produced, and can be presented to the user with or without a search query having been entered into the search box.

The scope option generator 122 is generally responsible for generating scope options, which are displayed by way of the display component 126. Scope options, as used herein, are options that are selectable to a user who wishes to perform a search or at least be provided with suggested results (e.g., such as when a search query is not entered by the user). The scope options function to narrow the search so that only the most relevant search results are returned to the user. For example, if the user wishes to search only for applications on his/her computing device, a scope options may be available that provides results that are applications only. If the user wishes to search only web documents, a search options may be available that would produce only web documents. Other exemplary search options include "settings," "music," "images," "videos," and "files," although other search options not specifically mentioned herein are contemplated to be within the scope of aspects provided herein.

While traditionally, suggested search results, such as results associated with a user's recent activity or based on popular searches, have been provided to a user without any scope options, aspects provided herein facilitate a more efficient way to narrow a search. This more efficient way provides search results that are more relevant to the user's intent. As such, the search results generator 124 is generally responsible for providing search results, whether the search is based on solely a selected scope option, a user's entered search query, or both.

Figure 2:
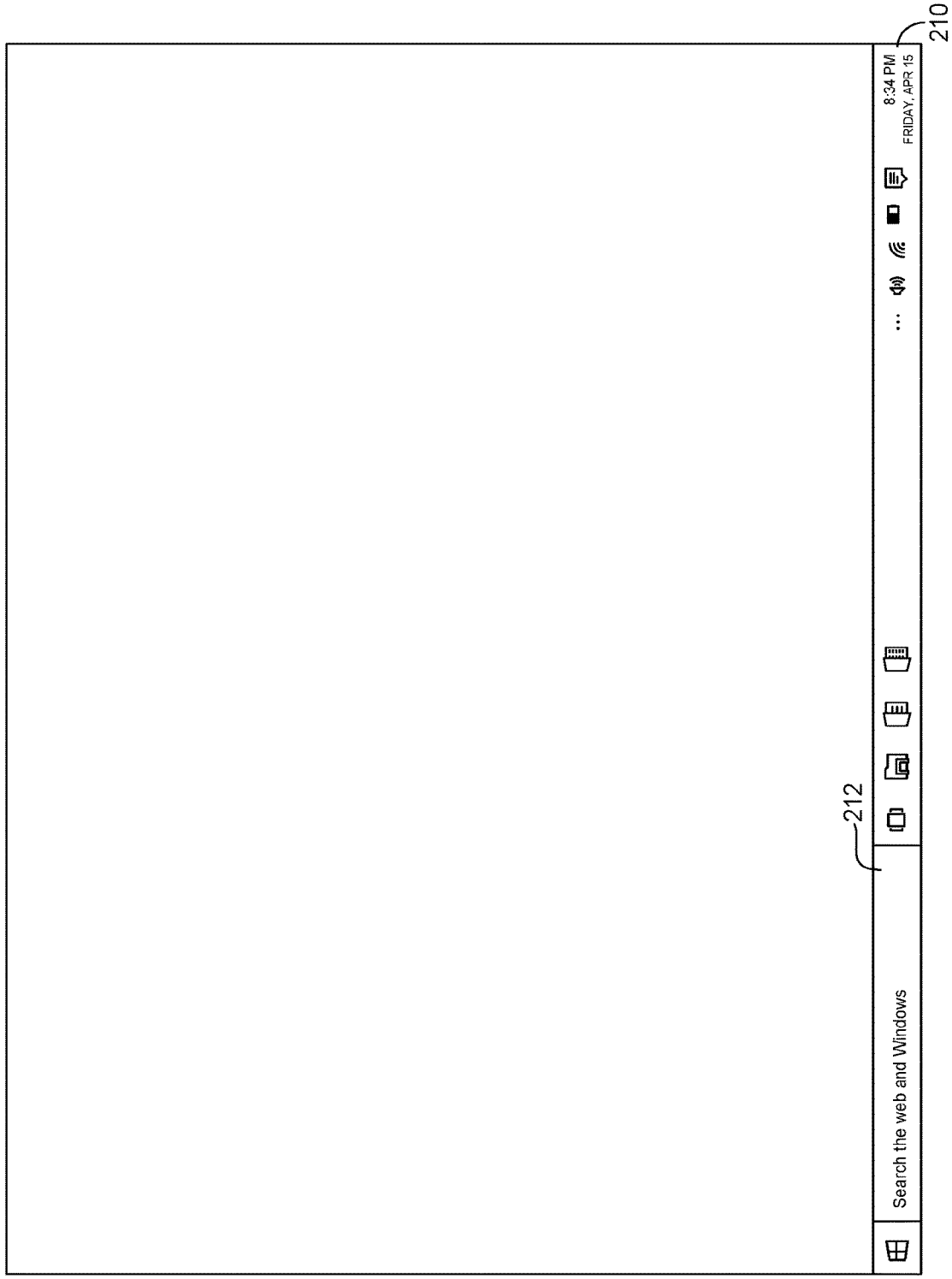
FIG. 2 is a screenshot of an exemplary desktop with a search box, in accordance with aspects herein.

FIGS. 2-9 illustrate various screenshots of exemplary desktops, some having zero input boxes and scope options. Turning initially to FIG. 2, a screenshot is depicted of an exemplary desktop 200 with a search box, in accordance with aspects herein. Desktop 200 includes a taskbar 210 and a search box 212. As shown here, the search box 212 is integrated into the taskbar 210, but this is illustrated for exemplary purposes only. Alternatively, the search box could be located in another portion of the desktop, or even on another screen other than the desktop. As used herein, the desktop screen refers to the screen that appears on the display prior to any applications or files being opened by the user. For example, the desktop screen may be blank but may show files that are stored on the user's desktop. As mentioned, the search box could be located in another area of the display.

FIG. 3 is a screenshot of an exemplary desktop 300 having a zero input box and scope options, in accordance with aspects herein. From FIG. 2, a user may have somehow interacted with the search box 212, such as hovering, selecting, clicking in the search box 212, etc. Once interacted with, FIG. 3 illustrates that a zero input box 320 appears on a portion of the desktop 300. FIG. 3, illustrating both a taskbar 310 and a search box 312, also illustrates that a user has interacted with the search box 312 by showing a cursor 314 in the search box 312. As mentioned, as a result of this interaction, the zero input box 320 has appeared. The zero input box 320 comprises two portions, one being the search results portion and the other being the scope options portion 316. The search results portion, at least initially, could include files and other items related to the user's recent activity on the computing device, and popular searches, such as recent news events, most often searched/viewed results, etc. In embodiments, these search results that appear before a user has entered a search query and even before the user has selected a scope option may be unfiltered suggestions across multiple domains (e.g., across multiple search scopes). In the scope options portion 316, various scope options, including "Apps," "Settings," "Files," and "Web" are displayed which allow the user to refine the user's intent to produce the most relevant search results, whether the user desires to search locally, on the web, or both. It is noted that the specific set of scope options provided to a user could be static (unchanging) or could be dynamic based on signals such as the user's past use, location, installed software, system capabilities, or user preferences.

Additionally, in one aspect and as shown in FIG. 3, the user may have the option to hide the scope options portion 316 of the zero input box 320, or at least hide the scope options themselves. Item 318 represents a selectable option that will either hide the scope options or cause them to reappear, if they have been previously hidden. While the scope options are illustrated in a single row in FIG. 3, the scope options could be presented in any other way, such as in multiple rows. Also, while four exemplary scope options are illustrated, it is contemplated that there could be any other number of scope options. For example, in addition to those illustrated in FIG. 3, scope options could include "Photos," "Music," "Videos," etc.

Figure 4:
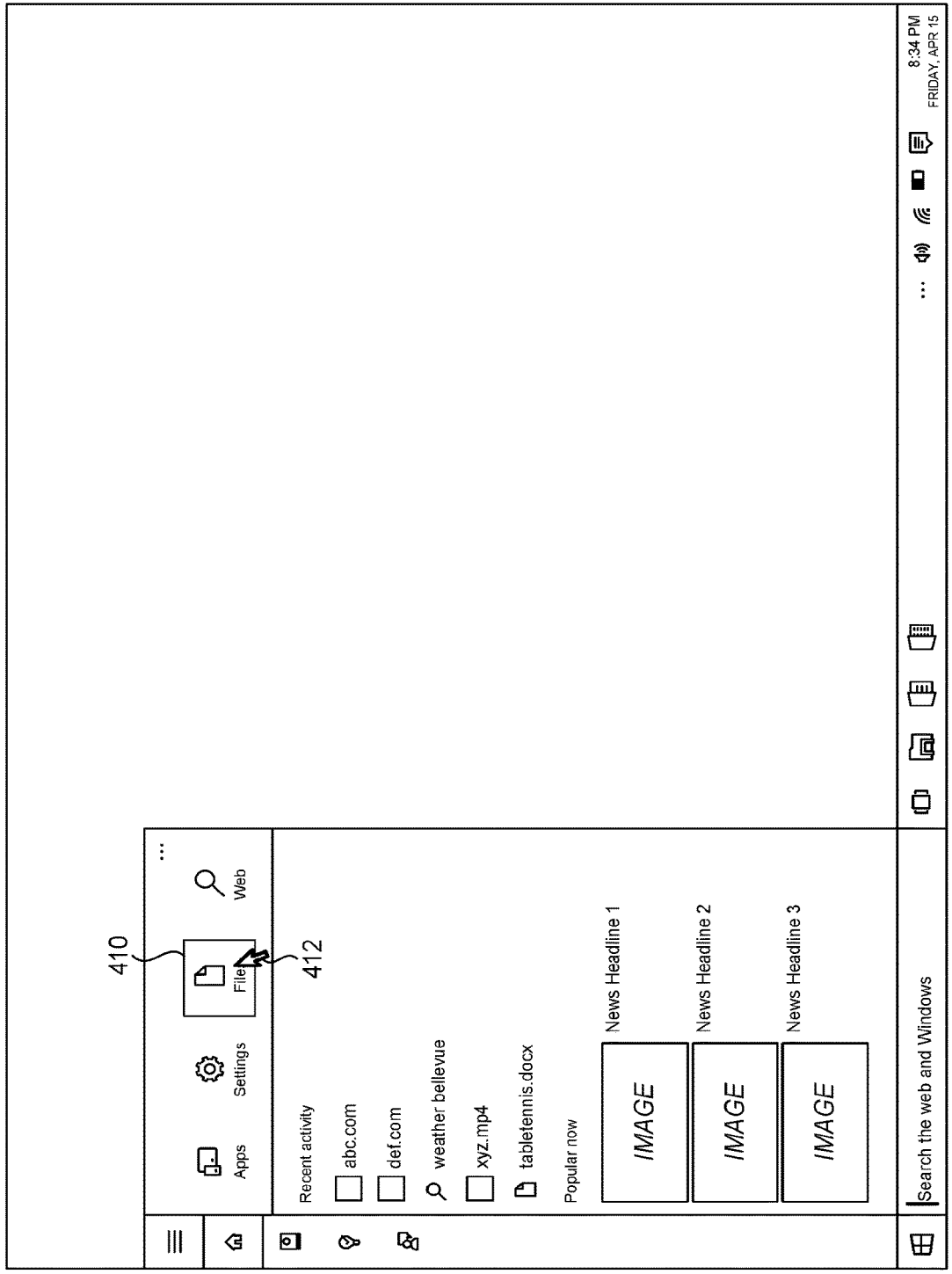
FIG. 4 is a screenshot of an exemplary desktop having a zero input box and search options, in accordance with aspects herein.
Figure 5:
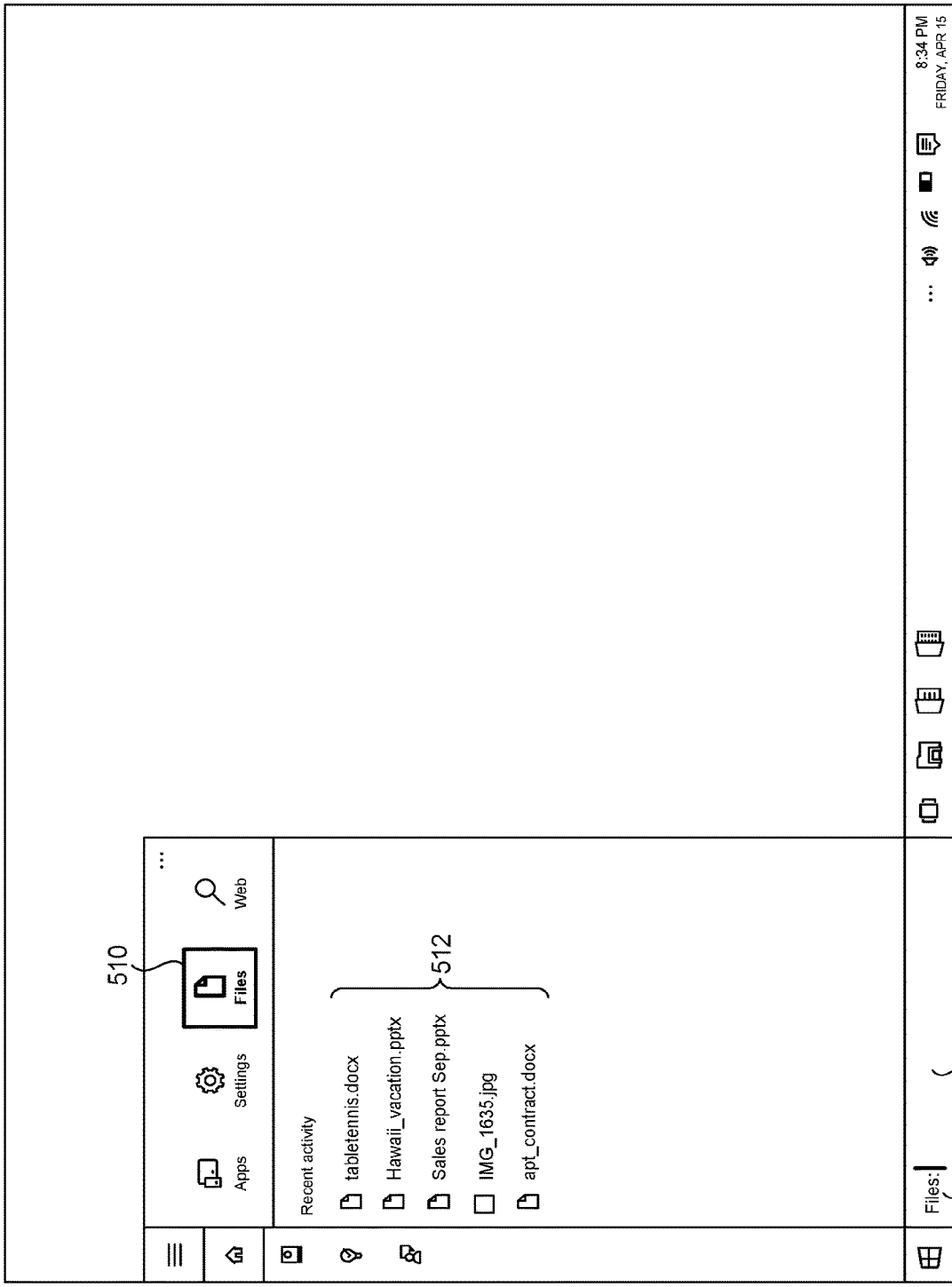
FIG. 5 is a screenshot of an exemplary desktop having a zero input box and search options, in accordance with aspects herein.

FIG. 4 illustrates a screenshot of an exemplary desktop 400 having a zero input box and scope options, in accordance with aspects herein. As shown in FIG. 4, a user is currently hovering over scope option 410, as indicated by cursor 412 on scope option 410. In aspects, the scope option that the cursor is hovering over could visually be changed, such as a box, highlight, different color, etc. As shown here, scope option 410 has a box around it to indicate to the user that the user is hovering over that scope option. FIG. 5 illustrates the result of the user selecting the "Files" scope option. As shown here, the user has selected the "Files" scope option 510, resulting in a new, and refined set of search results 512. For example, instead of generic results, search results 512 are tailored to the user's selection of the "Files" scope option 510, and thus are solely comprised of files, such as files on the user's desktop or other local drive. As shown here, "Recent activity" in the search results portion of the zero input box has been filtered to show only items of type "file." Additionally, in this aspect, the search box 514 has been updated to state "Files:" 516, indicating how the search has been refined. The indication is useful to the user as confirmation feedback that their action has had an effect. Additionally, functionally, this string is interpreted by the search results generator as a partial query, which is how the scoped suggestions are generated in the next step.

In aspects, the entering of "Files:" 516 into the search box 514 is an automatic action by the system and does not require user input or user action. This automatic entering of "Files:" 516 into the search box 514 may occur as a result of the user selecting the "Filed" scope option. At this point, the user's intended result may already be shown in the list, enabling the user to select the desired result with just one more selection (e.g., click). At this point, the user has not entered any characters into the search box 514.

Figure 6:
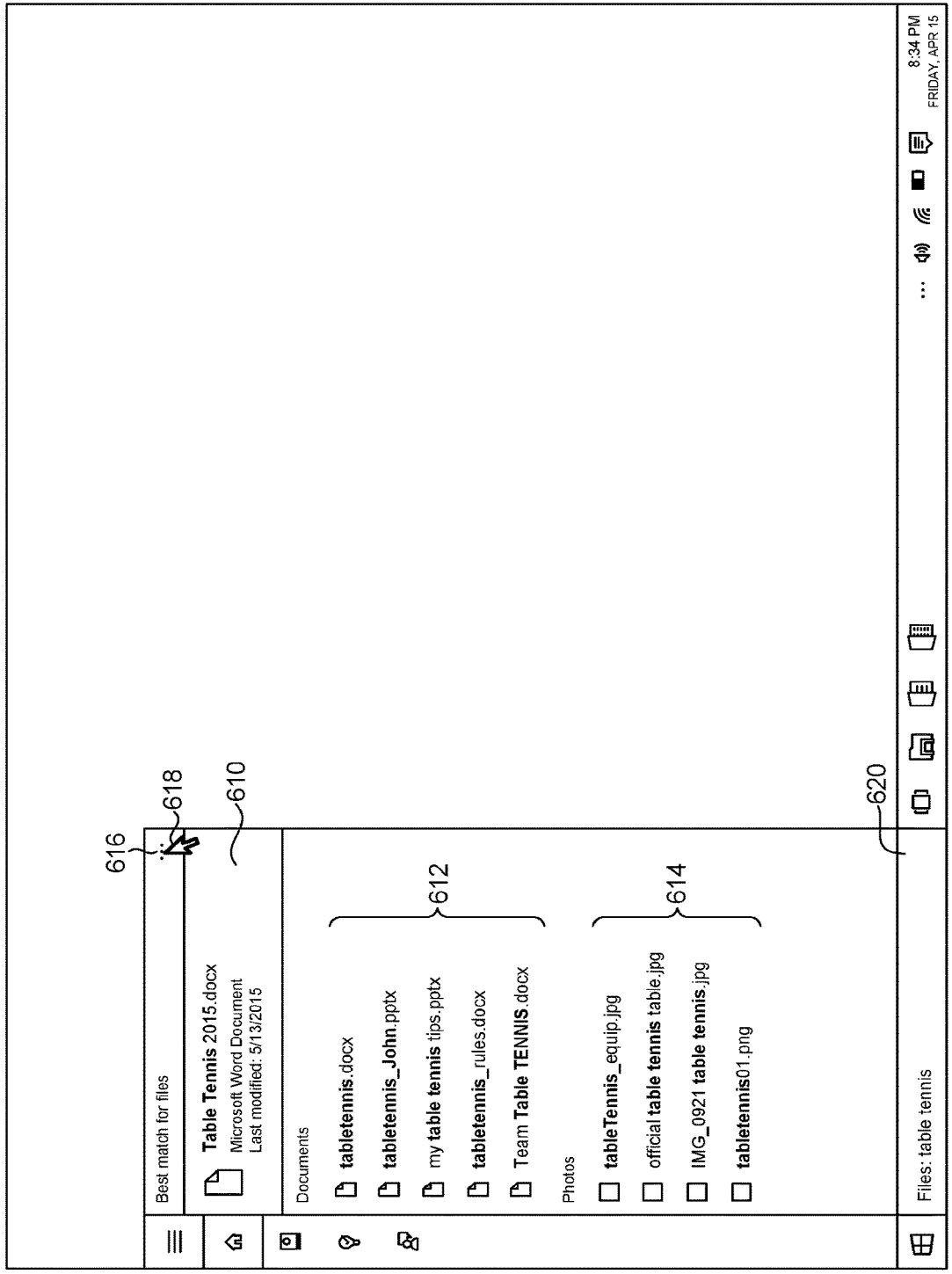
FIG. 6 is a screenshot of an exemplary desktop having a zero input box, in accordance with aspects herein.

Referring now to FIG. 6, a screenshot of an exemplary desktop 600 is depicted having a zero input box, in accordance with aspects herein. From FIG. 5 to FIG. 6, the user has entered characters into the search box 620. Here, the user has inputted "table tennis" after "Files:" to further refine the search results. The search results portion of the zero input box, including both portions 612 and 614, illustrates how the results have been filtered to reflect the scope of "Files" and to only show those matches for the full-text query of "Files: table tennis." FIG. 6 additionally illustrates how the user is presented with the "best match for files" 610, and is also provided with a mechanism to change the scope without starting the search over. Selectable item 616 can be selected by the user using cursor 618, for example, to cause the scope options to reappear on the zero input box, allowing the user to select a different scope option.

Figure 7:
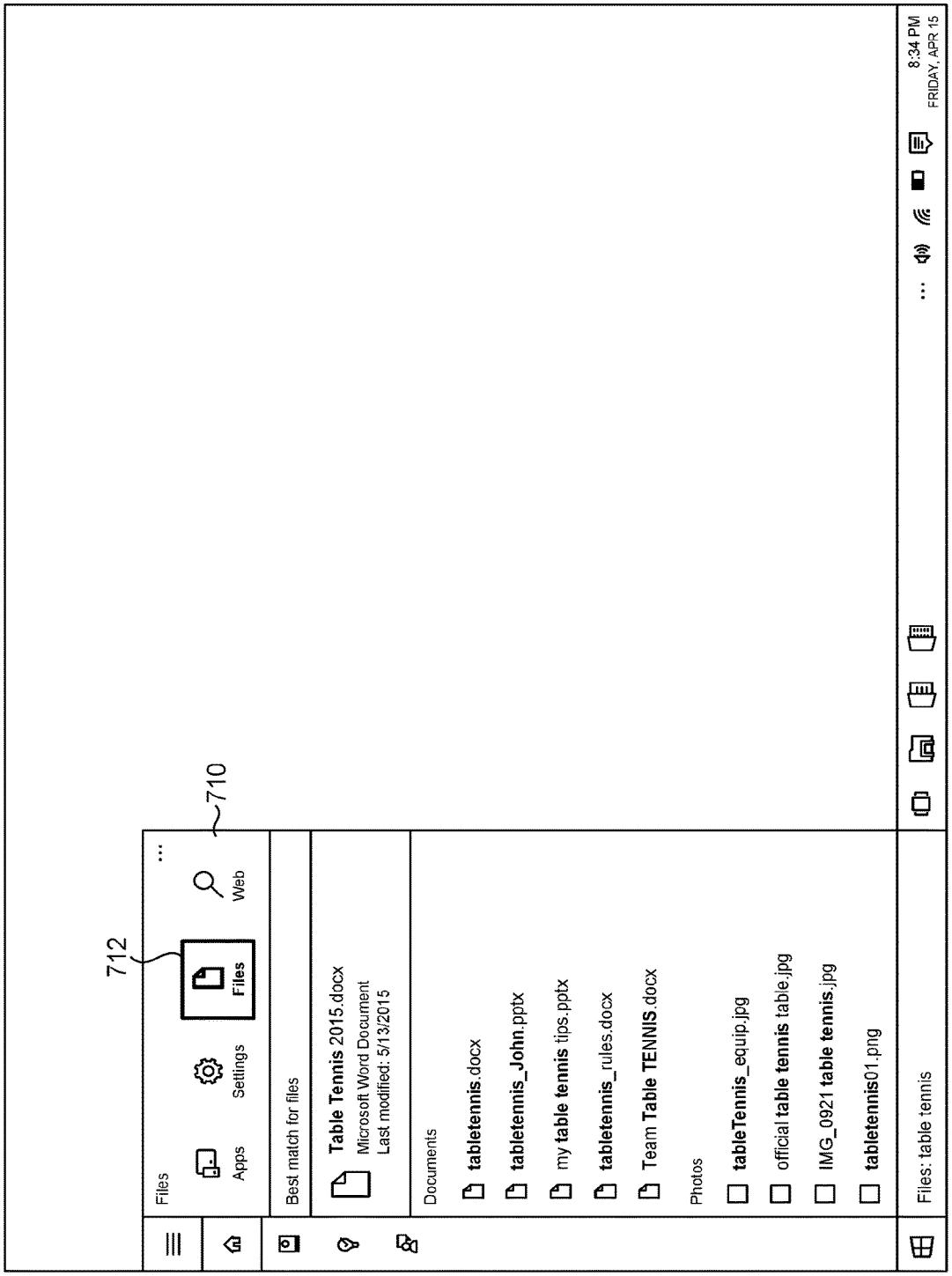
FIG. 7 is a screenshot of an exemplary desktop having a zero input box and search options, in accordance with aspects herein.
Figure 8:
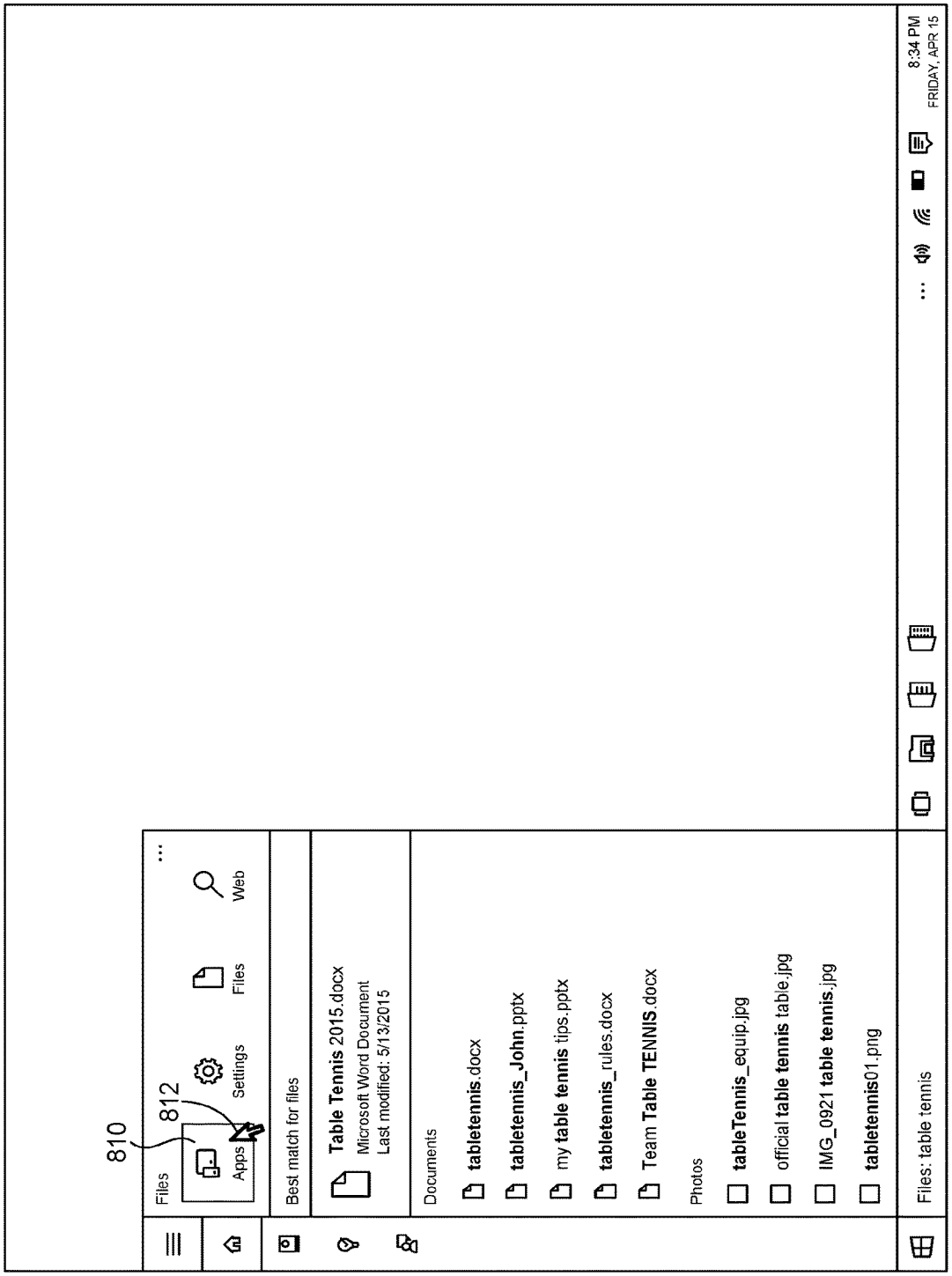
FIG. 8 is a screenshot of an exemplary desktop having a zero input box and search options, in accordance with aspects herein.
Figure 9:
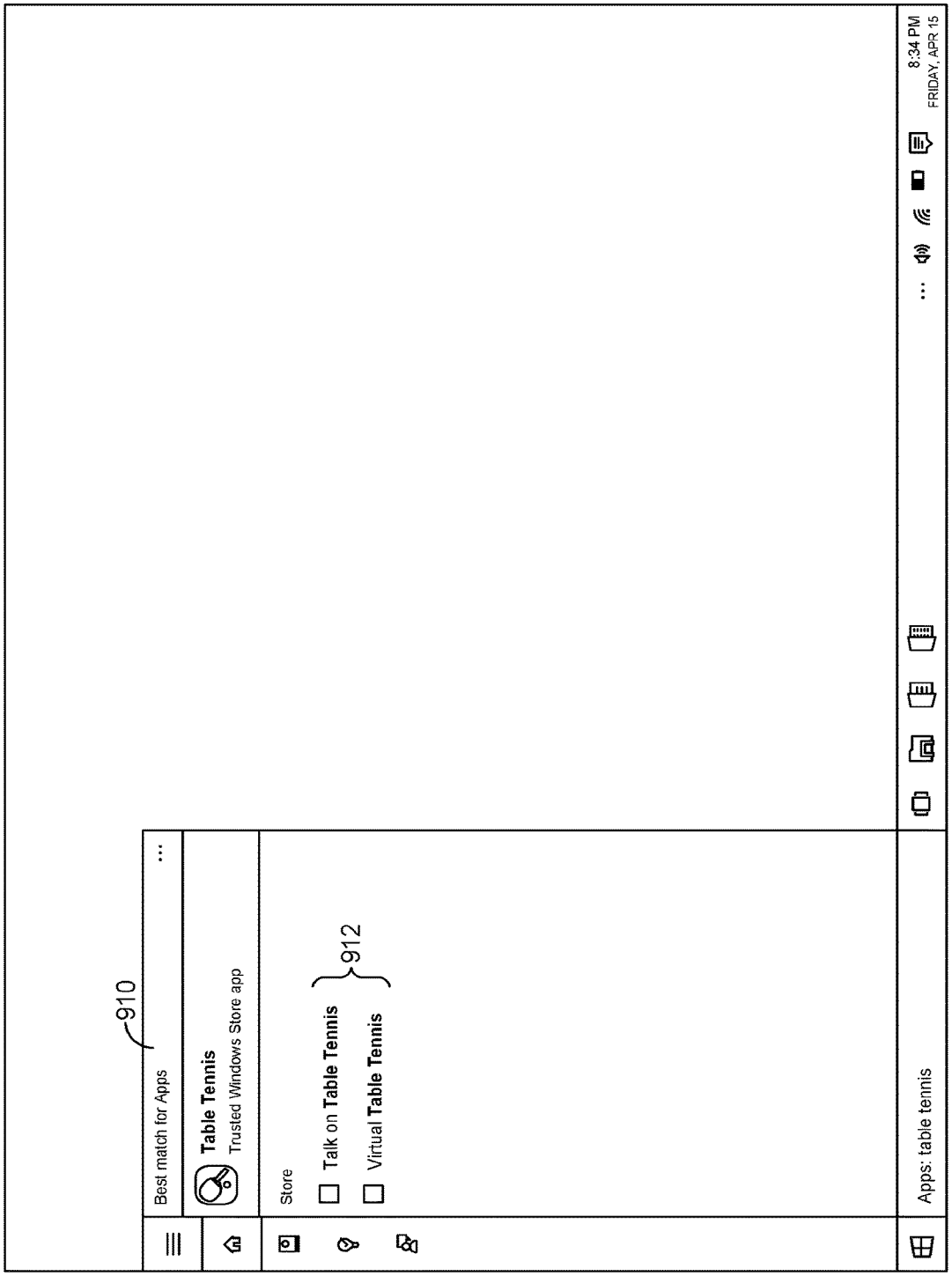
FIG. 9 is a screenshot of an exemplary desktop having a zero input box, in accordance with aspects herein.

With the reappearance of the scope options, the user may elect to change scopes of the search. FIG. 7 is a screenshot of an exemplary desktop 700 having a zero input box and search options, in accordance with aspects herein, and illustrates how the scope options 710 are now visible to the user on the zero input box. Scope option 712 is still visibly different than the others (e.g., highlighted, boxed, etc.), indicating that the current results are still filtered to that scope option 714. As illustrated in FIG. 8, which is a screenshot of an exemplary desktop 800 having a zero input box and search options, the user is hovering over a different scope option "Apps" 810, as shown by the cursor 812 hovering over the scope option "Apps." FIG. 9 illustrates another exemplary desktop 900 having the new, filtered and refined search results according to the newly selected scope option "Apps." A best match 910 for this scope option is provided, in addition to the search results 912 that are filtered to only display applications. In some aspects, selecting a scope options such as "Apps" provides only those results that are stored locally, only those that are found by way of a web search, or both.

Figure 10:
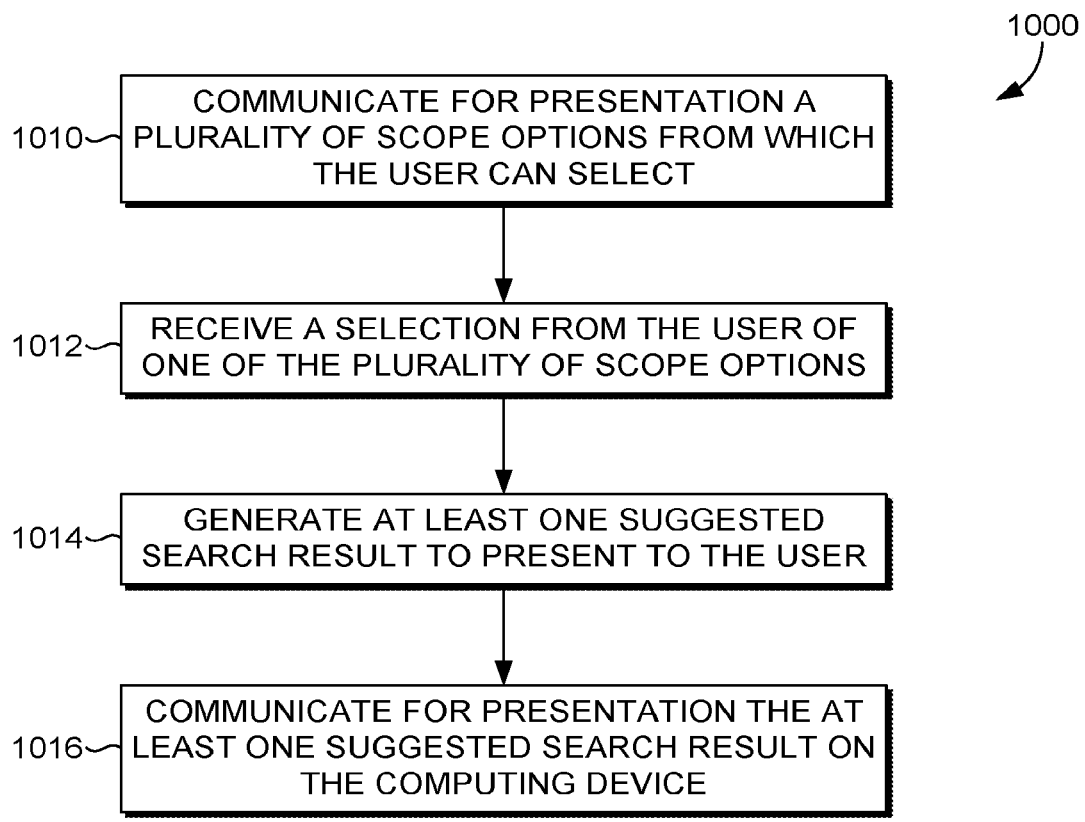
FIG. 10 is a flow diagram depicting a method for enabling a user to narrow a scope of a search on a computing device to provide relevant search results to the user, in accordance with an aspect of the technology described herein.

Turning now to FIG. 10, a flow diagram depicting a method 1000 is illustrated for enabling a user to narrow a scope of a search on a computing device to provide relevant search results to the user, in accordance with an aspect of the technology described herein. Initially at box 1010, a plurality of scope options is communicated for presentation, where the user may select one of the scope options to filter the search results. The scope options, in one aspect, are communicated for presentation prior to receiving a search query from the user in a search box of a desktop taskbar. The plurality of scope options allows the user to select from web-based searches, local searches or a combination thereof. Even before a scope option is selected by the user, generic search results may be displayed, such as recent items for the user, or popular searches. At block 1012, a selection is received from the user of one of the scope options. Exemplary scope options include an applications, files, settings, web, music, photos, videos, etc. Suggested search results to be presented to the user are generated at block 1014. These suggested search results are generated based on the received selection of the scope option, and thus the search results are of a type consistent with the selected scope option.

At block 1016, the suggested search results are communicated for presentation on a display of the user's computing device. Once the suggested search results are displayed, the scope options may be removed from display. In some aspects, the scope options may appear, disappear, and/or reappear on the display without any user interaction, such as based on a determination of where the user is in his/her current search. In other aspects, the user may have control of when the scope options are displayed. For instance, a selectable option may be displayed that, when selected, causes the scope options to appear or to disappear from the display. In still other aspects, the system may operate to determine when to display the scope options, but the user may also have control of this.

Once the user has selected a first scope option, such as at block 1012, the user may proceed to select a second and different scope option. A second set of search results may be generated based on the received second selection of the scope options. These results are then communicated for presentation on the user's display. The user selection of a second or other subsequent scope options may either further refine or narrow the previous set of search results, or may take into account all search results and refine them from that point of the search. At some point during this process, such as either or both of after the user selects a first or second scope option, the user may enter a search query into the search box, such as of the desktop toolbar.

Figure 11:
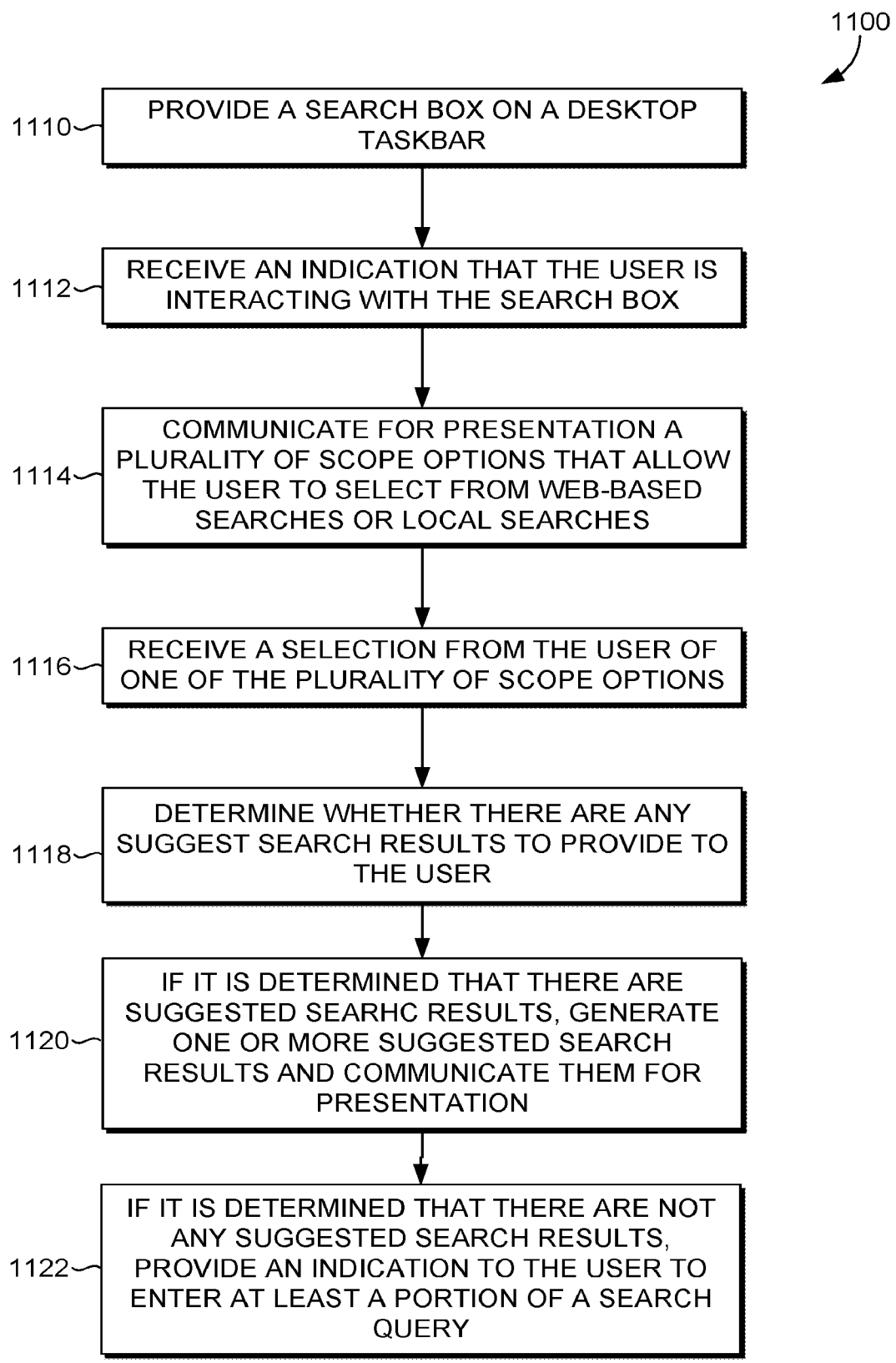
FIG. 11 is a flow diagram depicting another method for enabling a user to narrow a scope of a search on a computing device to provide relevant search results to the user, in accordance with an aspect of the technology described herein.

FIG. 11 is a flow diagram depicting another method 1100 for enabling a user to narrow a scope of a search on a computing device to provide relevant search results to the user, in accordance with an aspect of the technology described herein. At block 1110, a search box on a desktop taskbar is provided. An indication is received at block 1112 that the user is interacting with the search box. The indication could be a hover action, a click on the search box, or the like. At block 1114, scope options are communicated for presentation, where the scope options allow the user to select from web-based searches or local searches. The scope options may be communicated for presentation even before a search query has been received from the user in the search box of the desktop taskbar. Prior to a scope option being selected, generic search results may be communicated for presentation, such as those related to the user's recent activity or popular searches. At block 1116, a selection of a scope option is received. Based on this selection, it is determined whether there are any suggested search results to be generated based on the selected scope option, shown at block 1118. If it is determined that there are suggested search results at block 1120, at least one suggested search results is generated and are communicated for presentation. However, if, at block 1122, it is determined that there are not any suggested search results, an indication may be provided to the user to enter at least a portion of a search query. The suggested search results generated as a result of the user entering a query may be filtered or refined based on the scope option previously selected by the user. As such, after the scope option has been selected, the user may desire to further refine the search results by entering a search query into the search box of the desktop taskbar.

Figure 12:
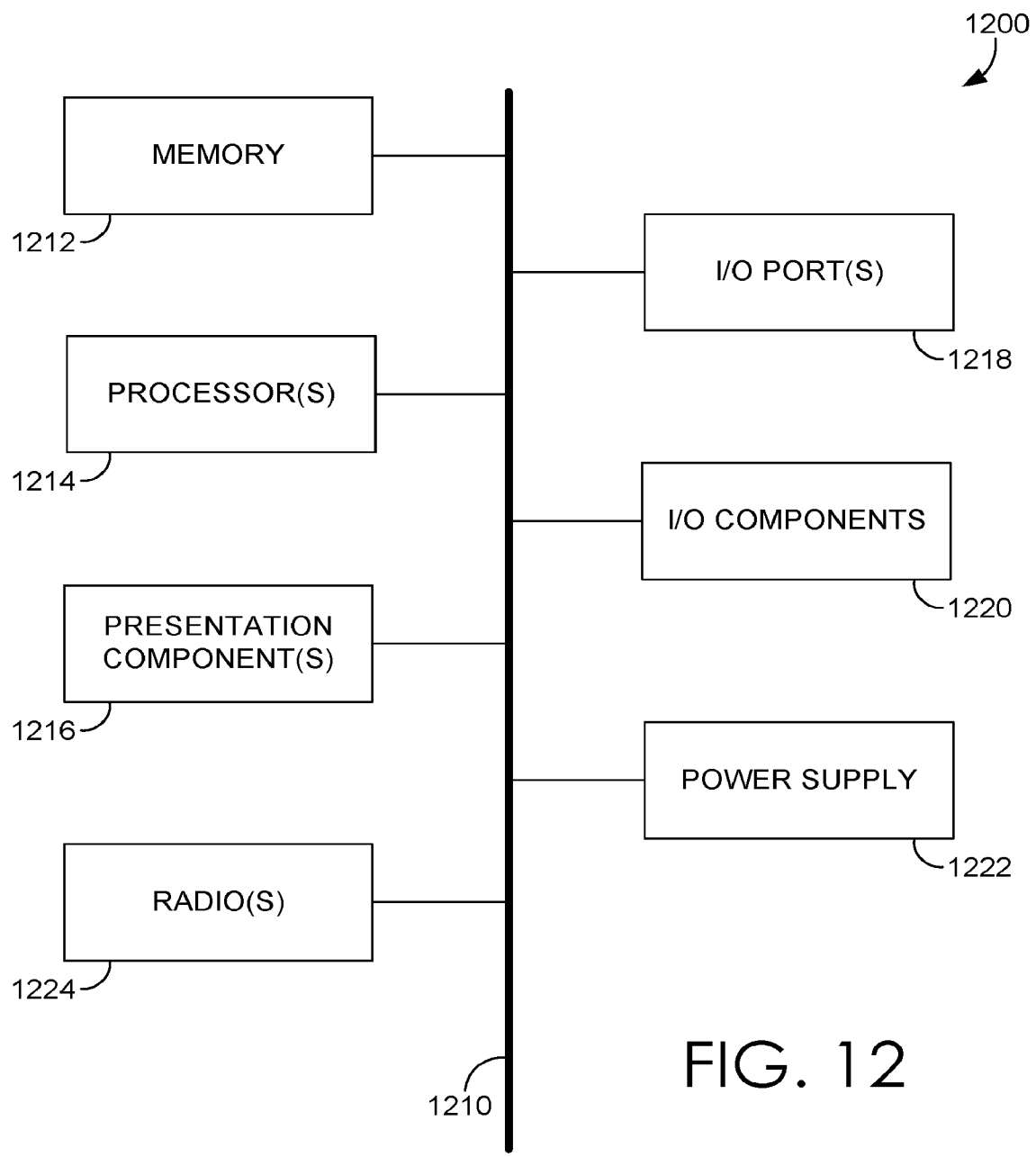
FIG. 12 is a block diagram of an exemplary computing environment suitable for implementing aspects of the technology described herein.

Referring now to FIG. 12, an exemplary operating environment for implementing aspects of the technology described herein is shown and designated generally as computing device 1200. Computing device 1200 is just one example of a suitable computing environment and is not intended to suggest any limitation as to the scope of use of the technology described herein. Neither should the computing device 1200 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 12, computing device 1200 includes a bus 1210 that directly or indirectly couples the following devices: memory 1212, one or more processors 1214, one or more presentation components 1216, input/output (I/O) ports 1218, I/O components 1220, and an illustrative power supply 1222. Bus 1210 represents what may be one or more busses (such as an address bus, data bus, or a combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 12 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 12 and refer to "computer" or "computing device." The computing device 1200 may be a PC, a tablet, a smartphone, virtual reality headwear, augmented reality headwear, a game console, and such.

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile and/or nonvolatile memory. The memory 1212 may be removable, non-removable, or a combination thereof. Exemplary memory includes solid-state memory, hard drives, optical-disc drives, etc. Computing device 1200 includes one or more processors 1214 that read data from various entities such as bus 1210, memory 1212, or I/O components 1220. Presentation component(s) 1216 present data indications to a user or other device. Exemplary presentation components 1216 include a display device, speaker, printing component, vibrating component, etc. I/O ports 1218 allow computing device 1200 to be logically coupled to other devices, including I/O components 1220, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1214 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1200. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

The computing device 1200 may include a radio 1224. The radio transmits and receives radio communications. The computing device 1200 may be a wireless terminal adapted to receive communications and media over various wireless networks. Computing device 1200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Embodiment 1: A method for enabling a user to narrow a scope of a search on a computing device to provide relevant search results to the user, the method comprising: prior to receiving a search query from the user in a search box of a desktop taskbar, communicating for presentation a plurality of scope options from which the user can select, wherein the plurality of scope options enable the user to select from web-based searches and local searches; receiving a selection from the user of one of the plurality of scope options; based on the received selection of the one of the plurality of scope options, generating at least one suggested search result to present to the user; and communicating for presentation the at least one suggested search result on a display of the computing device.

Embodiment 2: The method of Embodiment 1, further comprising removing from display the plurality of scope options subsequent to the communication of the at least one suggested search result.

Embodiment 3: The method of any of the above Embodiments, further comprising displaying a selectable option that, when selected, causes the plurality of scope options to be displayed.

Embodiment 4: The method of any of the above Embodiments, further comprising: receiving a second selection by the user of a second of the plurality of scope options; generating a second set of one or more search results based on the received second selection by the user of the second of the plurality of scope options; and communicating for presentation the second set of the one or more suggested search results that are based on the received second selection of the second of the plurality of scope options.

Embodiment 5: The method of any of the above Embodiments, wherein the at least one suggested search result is of a type consistent with the selected one of the plurality of scope options.

Embodiment 6: The method of any of the above Embodiments, wherein the plurality of scope options comprise one or more of an applications option, a settings option, a files options, or a web option.

Embodiment 7: The method of any of the above Embodiments, further comprising receiving the search query from the user in the search box of the desktop taskbar.

Embodiment 8: The method of Embodiment 7, wherein the search query is received after the selection is received of the one of the plurality of scope options.

Embodiment 9: The method of any of the above Embodiments, further comprising communicating for presentation one or more generic search results.

Embodiment 10: The method of Embodiment 9, wherein the one or more generic search results relate to the user's recent activity or popular searches.

Embodiment 11: A computing device comprising: at least one processor; and a computer storage memory having computer-executable instructions stored thereon which, when executed by the at least one processor, configure the computing device to: prior to receiving a search query from the user in a search box of a desktop taskbar, communicate for presentation a plurality of scope options from which the user can select, wherein the plurality of scope options enable the user to select from web-based searches and local searches, receive a selection from the user of one of the plurality of scope options, based on the received selection of the one of the plurality of scope options, generate at least one suggested search result to present to the user, and communicate for presentation the at least one suggested search result on a display of the computing device.

Embodiment 12: The computing device of Embodiment 11, wherein the computing device is further configured to: receive a second selection by the user of a second of the plurality of scope options; generating a second set of one or more search results based on the received second selection by the user of the second of the plurality of scope options; and communicating for presentation the second set of the one or more suggested search results that are based on the received second selection of the second of the plurality of scope options.

Embodiment 13: The computing device of any of Embodiments 11 or 12, wherein the computing device is further configured to: receive a second selection by the user of a second of the plurality of scope options; generating a second set of one or more search results based on the received second selection by the user of the second of the plurality of scope options; and communicating for presentation the second set of the one or more suggested search results that are based on the received second selection of the second of the plurality of scope options.

Embodiment 14: One or more computer storage hardware devices having computer-executable instructions embodied thereon that, when executed, enable a user to narrow a scope of a search on a computing device to provide relevant search results to the user, the method comprising: providing a search box on a desktop taskbar, where the search box enables the user to search both on the web and locally; receiving an indication that the user is interacting with the search box; in response to the indication and prior to receiving a search query from the user in the search box of the desktop taskbar, communicating for presentation a plurality of scope options that allow the user to select from web-based searches or local searches; receiving a selection from the user of one of the plurality of scope options; determining whether there are any suggested search results based on the received selection of the one of the plurality of scope options; if it is determined that there are suggested search results, generating one or more suggested search results based on the received selection of the one of the plurality of scope options, and communicating for presentation the one or more suggested search results that are based on the received selection of the one of the plurality of scope options; and if it is determined that there are not any suggested search results, providing an indication to the user to enter at least a portion of a search query in the search box.

Embodiment 15: The one or more computer storage hardware devices of Embodiment 14, wherein if it is determined that there are not any suggested search results, further comprising: receiving the at least the portion of the search query in the search box; and generating one or more suggested search results that are filtered according to the received selection of the one of the plurality of scope options.

Embodiment 16: The one or more computer storage hardware devices of Embodiment 14, further comprising generating one or more generic search results to provide to the user prior to the user has selected the one of the plurality of scope options, wherein the one or more generic search results relate to one or more of the user's recent activity or popular searches.

Embodiment 17: The one or more computer storage hardware devices of any of Embodiments 14-16, further comprising: receiving a second selection by the user of a second of the plurality of scope options; determining whether there are any suggested search results based on the received second selection of the second of the plurality of scope options; if it is determined that there are suggested search results, generating one or more suggested search results based on the received second selection of the second of the plurality of scope options, and communicating for presentation the one or more suggested search results that are based on the received second selection of the second of the plurality of scope options; and if it is determined that there are not any suggested search results, providing an indication to the user to enter at least a portion of a search query in the search box.

Embodiment 18: The one or more computer storage hardware devices of any one of Embodiment 14-17, wherein the plurality of scope options comprise one or more of an applications option, a settings option, a files options, or a web option.

Embodiment 19: The one or more computer storage hardware devices of any one of Embodiments 14-18, further comprising receiving the search query from the user in the search box of the desktop taskbar.

Embodiment 20: The one or more computer storage hardware devices of Embodiment 19, wherein the search query is received after the selection is received of the one of the plurality of scope options.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A method for enabling a user to narrow a scope of a search on a computing device to provide relevant search results to the user, the method comprising:
   communicating for presentation a plurality of scope options from which the user can select, wherein the plurality of scope options enable the user to select from web-based searches and local searches;
   performing an unfiltered search across a default set of scopes of the plurality of scope options as a result of the user interacting with a search box;
   receiving a selection from the user of one scope option of the plurality of scope options;
   based on the selection of the one scope option of the plurality of scope options, generating at least one suggested search result to present to the user;
   receiving a second selection by the user of a second of the plurality of scope options;
   generating a second set of one or more search results based on the second selection by the user of the second of the plurality of scope options; and
   communicating for presentation the at least one suggested search result on a display of the computing device and the second set of one or more search results that are based on the second selection of the second of the plurality of scope options.

2. The method of claim 1, further comprising removing from the display the plurality of scope options subsequent to communicating for presentation the at least one suggested search result.

3. The method of claim 1, further comprising displaying a selectable option that, when selected, causes the plurality of scope options to be displayed.

4. The method of claim 1, wherein the at least one suggested search result is of a type consistent with the one scope option of the plurality of scope options.

5. The method of claim 1, wherein the plurality of scope options comprise one or more of an applications option, a settings option, a files options, or a web option.

6. The method of claim 1, further comprising receiving an initial search query from the user in the search box.

7. The method of claim 6, wherein the initial search query is received after the selection is received of the one scope option of the plurality of scope options.

8. The method of claim 6, further comprising communicating for presentation one or more generic search results.

9. The method of claim 1, wherein the at least one suggested search result relates to the user's recent activity or popular searches.

10. A computing device comprising:
    at least one processor; and
    a computer storage memory having computer-executable instructions stored thereon which, when executed by the at least one processor, configure the computing device to:
    communicate for presentation a plurality of scope options from which a user can select, wherein the plurality of scope options enable the user to select from web-based searches and local searches;
    perform an unfiltered search across a default set of scope options of the plurality of scope options as a result of the user interacting with a search box;
    receive a selection from the user of one scope option of the plurality of scope options;
    based on the selection of the one scope option of the plurality of scope options, generate at least one suggested search result to present to the user;
    communicate for presentation the at least one suggested search result on a display of the computing device;
    receive a second selection by the user of a second of the plurality of scope options;
    generating a second set of one or more search results based on the second selection by the user of the second of the plurality of scope options; and
    communicating for presentation the second set of the one or more search results that are based on the second selection of the second of the plurality of scope options.

11. The computing device of claim 10, wherein the plurality of scope options comprise one or more of an applications option, a settings option, a files options, or a web option.

* * * * *